US008982299B2

(12) United States Patent
Yu et al.

(10) Patent No.: US 8,982,299 B2
(45) Date of Patent: Mar. 17, 2015

(54) LIGHT EMITTING DEVICE COMPRISING A PLURALITY OF FIXING MEMBERS DISPOSED AT DIFFERENT SIDES OF A BOTTOM COVER

(75) Inventors: Dong Kug Yu, Seoul (KR); Sung Yong Park, Seoul (KR); Young Bae Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 90 days.

(21) Appl. No.: 13/114,699

(22) Filed: May 24, 2011

(65) Prior Publication Data

US 2011/0292320 A1 Dec. 1, 2011

(30) Foreign Application Priority Data

May 25, 2010 (KR) ........................ 10-2010-0048496

(51) Int. Cl.
  *G02F 1/1335* (2006.01)
  *G09F 13/04* (2006.01)
  *F21V 8/00* (2006.01)
  *G02F 1/1333* (2006.01)

(52) U.S. Cl.
  CPC ............ *G02B 6/0086* (2013.01); *G02B 6/0051* (2013.01); *G02B 6/005* (2013.01); *G02F 2001/133322* (2013.01)
  USPC .......................................... 349/61; 362/97.2

(58) Field of Classification Search
  CPC .............. G02F 1/133621; G02F 2001/133626; G02F 1/133611
  USPC ..................... 349/61–65; 362/97.1–97.4, 615
  See application file for complete search history.

(56) References Cited

U.S. PATENT DOCUMENTS

| 5,729,310 A | 3/1998 | Horiuchi et al. |
| 2002/0080298 A1* | 6/2002 | Fukayama ...................... 349/58 |
| 2006/0007708 A1* | 1/2006 | Lee ............................... 362/632 |
| 2006/0132692 A1* | 6/2006 | Mo et al. ....................... 349/129 |
| 2008/0284939 A1* | 11/2008 | Lee et al. ......................... 349/58 |
| 2010/0128194 A1* | 5/2010 | Cho et al. ........................ 349/58 |

FOREIGN PATENT DOCUMENTS

| JP | 9-147618 A | 6/1997 |
| JP | 2001-216828 A | 8/2001 |
| JP | 2002-250915 A | 9/2002 |
| JP | 2002-318386 A | 10/2002 |
| JP | 2008-129259 A | 6/2008 |
| JP | 2009-176544 A | 8/2009 |
| JP | 2010-97924 A | 4/2010 |

(Continued)

*Primary Examiner* — Paul Lee
(74) *Attorney, Agent, or Firm* — Birch, Stewart, Kolasch & Birch, LLP

(57) ABSTRACT

Disclosed herein are a backlight unit and a display device. The backlight unit includes a bottom cover, a light emitting device module disposed at the lower portion of the inside of the bottom cover, a light guide plate disposed adjacent to the light emitting device module and disposed in front of the bottom cover, at least one optical sheet and a reflective sheet disposed adjacent to the light guide plate, recesses, each of which is disposed with one opened side, disposed at the edges of at least one of the light guide plate, the reflective sheet and the at least one optical sheet, and protrusions disposed at one side of the bottom cover disposed with the light emitting device module so as to be inserted into the recesses of the at least one of the light guide plate, the reflective sheet and the at least one optical sheet.

18 Claims, 14 Drawing Sheets

(56) References Cited

FOREIGN PATENT DOCUMENTS

| | | | |
|---|---|---|---|
| KR | 10-2005-0005166 A | 1/2005 |
| KR | 10-2005-0070197 A | 7/2005 |
| KR | 10-2006-0099101 A | 9/2006 |
| KR | 10-2008-0035240 A | 4/2008 |
| KR | 10-2008-0060101 A | 7/2008 |

* cited by examiner

LIGHT EMITTING DEVICE COMPRISING A PLURALITY OF FIXING MEMBERS DISPOSED AT DIFFERENT SIDES OF A BOTTOM COVER

This application claims the benefit of Korean Patent Application No. 10-2010-0048496, filed on May 25, 2010, which is hereby incorporated in its entirety by reference as if fully set forth herein.

BACKGROUND

The embodiments relates to a backlight unit and a display device, and more particularly to a backlight unit and a display device in which elements, such as a light guide plate and optical sheets, are mounted on a bottom cover while maximizing a space occupied by these elements.

Among display devices, a liquid crystal display device requires a backlight unit to display an image.

The backlight unit includes a bottom cover, a light emitting device disposed on the bottom cover to generate light, a light guide plate disposed adjacent to the light emitting device and disposed on the front surface of the bottom cover to guide light generated by the light emitting device, and optical sheets attached to the light guide plate to diffuse or refract light from the light guide plate.

Further, such a display device includes a display panel disposed on a progress route of the light emitted by the backlight unit.

SUMMARY

Accordingly, the embodiment is directed to a backlight unit and a display device.

An object of the embodiment is to provide a backlight unit and a display device in which positions of a light guide plate and optical sheets are fixed while maximizing an area in a bottom cover occupied by the light guide plate and the optical sheets.

Additional advantages, objects, and features of the embodiment will be set forth in part in the description which follows and in part will become apparent to those having ordinary skill in the art upon examination of the following or may be learned from practice of the embodiment. The objectives and other advantages of the embodiment may be realized and attained by the structure particularly pointed out in the written description and claims hereof as well as the appended drawings.

To achieve this object and other advantages and in accordance with the purpose of the embodiment, as embodied and broadly described herein, a backlight unit includes a bottom cover, a light emitting device module disposed at the lower portion of the inside of the bottom cover, a light guide plate disposed adjacent to the light emitting device module and disposed in front of the bottom cover, at least one optical sheet and a reflective sheet disposed adjacent to the light guide plate, recesses, each of which is disposed with one opened side, disposed at the edges of at least one of the light guide plate, the reflective sheet and the at least one optical sheet, and protrusions disposed at one side of the bottom cover disposed with the light emitting device module so as to be inserted into the recesses of the at least one of the light guide plate, the reflective sheet and the at least one optical sheet.

The recesses may be disposed in at least two and are separated from each other.

The protrusions may be disposed in at least two so as to correspond to the positions of the recesses and are separated from each other.

The positions of the recesses disposed on the at least one optical sheet, the positions of the recesses disposed on the light guide plate and the positions of the recesses disposed on the reflective sheets may be identical.

The at least one optical sheet, the light guide plate and the reflective sheet may be stacked, and the at least one optical sheet, the light guide plate and the reflective sheet may be supported by the protrusions.

The outer portions of the recesses may be opened in the direction of the edges of the light guide plate, the at least one optical sheet and the reflective sheet.

The inner portions of the recesses may be rounded.

The protrusions may be cylindrical bosses.

The radius of curvature of the rounded inner portions of the recesses may be greater than the radius of the cylindrical bosses.

The recesses may be formed in a U shape.

The horizontal width of the recesses and the vertical height of the recesses may be greater than the diameter of the protrusions.

The protrusions may be formed on the front surface of the bottom cover.

In another aspect of the embodiment, a display device includes a bottom cover, a light emitting device module disposed at the lower portion of the inside of the bottom cover, a light guide plate disposed adjacent to the light emitting device module and disposed in front of the bottom cover, at least one optical sheet disposed adjacent to the light guide plate, recesses, each of which is disposed with one opened side, disposed at the edges of at least one of the light guide plate, and the at least one optical sheet, protrusions protruded from the front surface of the bottom cover corresponding to the positions of the recesses so as to be inserted into the recesses to support the light guide plate and the at least one optical sheet, and a liquid crystal display panel disposed in front of the at least one optical sheet.

It is to be understood that both the foregoing general description and the following detailed description of the embodiment are exemplary and explanatory and are intended to provide further explanation of the embodiment as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
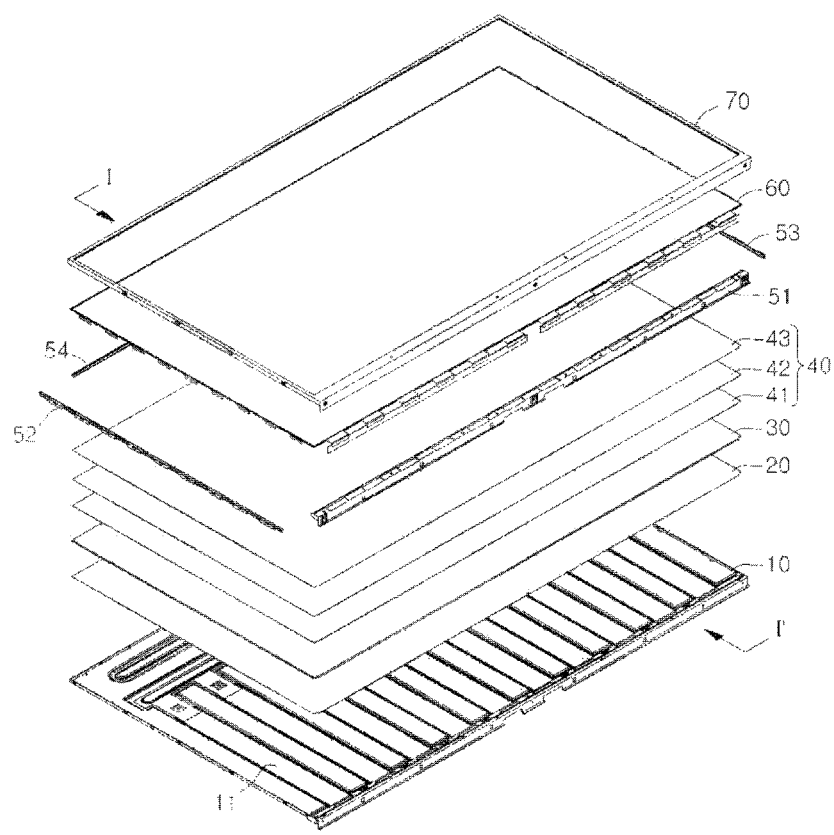
FIG. 1 is an exploded perspective view of a display device in accordance with an embodiment of the embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, a light emitting device and a method of manufacturing the same according to the embodiment will be described with reference to accompanying drawings.

As shown in FIG. 1, a display device in accordance with an embodiment of the embodiment includes a bottom cover 10, a light emitting module (not shown) disposed at one side of the inside of the bottom cover 10, a reflective sheet 20 disposed in front of the bottom cover 10, a light guide plate 30 disposed in front of the reflective sheet 20 to guide light emitted by the light emitting module toward the front portion of the display device, at least one optical sheet 40 disposed in front of the light guide plate 30, a liquid crystal display panel 60 disposed in front of the optical sheet 40, a top cover 70 disposed in front of the liquid crystal display panel 60, and fixing members 50 disposed between the bottom cover 10 and the top cover 70 to fix the bottom cover 10 and the top cover 70 together.

The light guide plate 30 serves to guide the light emitted by the light emitting module (not shown) so as to be converted into surface light, and the reflective sheet 20 disposed at the rear of the light guide plate 30 serves to reflect the light emitted from the light emitting module (not shown) in a direction of the light guide plate 30 so as to improve light efficiency.

The reflective sheet 20 may be disposed as a separate element as in FIG. 1, and be disposed by coating the rear surface of the light guide plate 30 or the front surface of the bottom cover 10 with a material having high reflectivity.

The at least one optical sheet 40 disposed in front of the light guide plate 30 serves to cause the light emitted by the light guide plate 30 to undergo diffusion and refraction so as to improve brightness and light efficiency.

A plurality of optical sheets 40 may be disposed or one optical sheet 40 may be disposed. That is, plural optical sheets 40 including a first diffusion sheet 41, a prism sheet 42 and a second diffusion sheet 43 may be disposed, or one optical sheet 40 functioning as both a diffusion sheet and a prism sheet may be disposed.

The number and kinds of the optical sheets 40 may vary according to required brightness characteristics.

Figure 2:
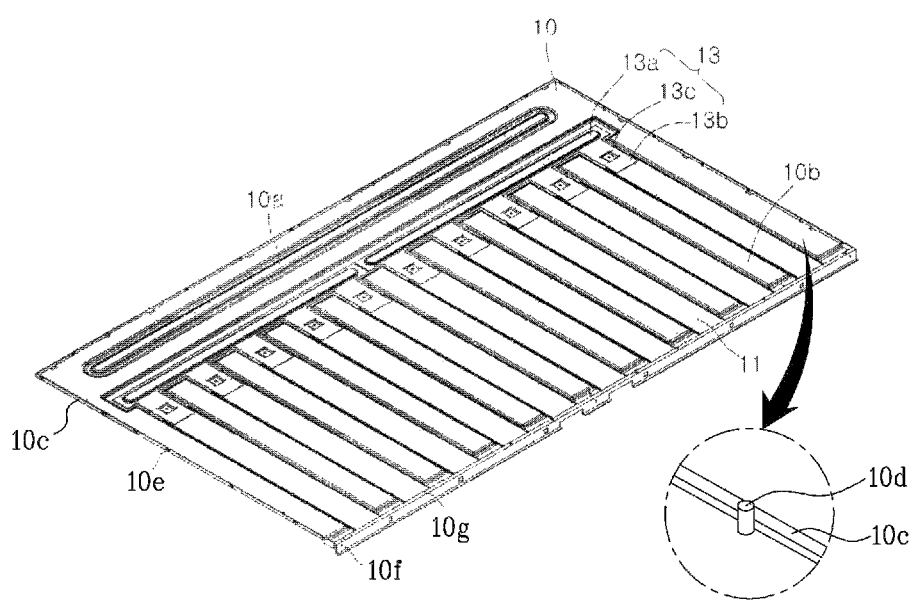
FIG. 2 is a perspective view illustrating the front surface of a bottom cover of a backlight unit of the display device in accordance with the embodiment of the embodiment.

FIG. 2 is a perspective view illustrating the front surface of the bottom cover 10 in accordance with the embodiment of the embodiment.

Preferably, the bottom cover 10 is of a plate type made of a metal, and in order to reinforce strength of the bottom cover 10, the bottom cover 10 include a first forming part 10a extended in the leftward and rightward directions and protruded forwards and second forming parts 10b being perpendicular to the disposition direction of the first forming part 10a and protruded.

The first forming part 10a and the second forming parts 10b are preferably formed by pressing the bottom cover 10.

Further, preferably, the front surfaces of the first forming part 10a and the second forming parts 10b form uniformly flat planes, and these flat planes have the same height.

This enables the reflective sheet 20 (with reference to FIG. 2) to be disposed on the first forming part 10a and the second forming parts 10b.

In order to reinforce the strength of the bottom cover 10, a plurality of second forming parts 10b is disposed so as to be separated from each other.

First heat dissipation members 11 disposed in a heat pipe or heat sink type are installed between the second forming parts 10b. Here, a plurality of first heat dissipation members 11 is disposed so as to be separated from each other.

The first heat dissipation members 11 serve to receive heat generated from the light emitting module (not shown) disposed on the bottom cover 10 during driving and to dissipate the heat to the outside. For this purpose, the first heat dissipation members 11 are preferably extended to a designated length in the bottom cover 10.

Since the second forming parts 10b are protruded forwards by a designated length, inclined planes are preferably formed at regions of the second forming parts 10b adjacent to the first heat dissipation members 11 so as to allow the first heat dissipation members 11 to be easily installed.

Forwardly bent edge walls 10c are disposed at the edges of the bottom cover 10, and serve to prevent the light guide plate 30, the optical sheets 40 or the reflective sheet 20 mounted within the bottom cover 10 from being separated from the bottom cover 10 to the outside.

Protrusions 10d supporting the light guide plate (with reference to FIG. 1), the reflective sheet 20 (with reference to FIG. 1) and the optical sheets 40 (with reference to FIG. 1) are disposed at portions of the front surface of the bottom cover 10 adjacent to the left and right edge walls 10c. The protrusions 10d are inserted into recesses (not shown) formed at the edges of the light guide plate 30, the reflective sheet 20 and the optical sheets 40.

Detailed shape and disposition of the protrusions 10d and relationships between the protrusions 10d and the recesses will be described later.

Connection holes 10f and log allowing the fixing members 50 (with reference to FIG. 1) and the top cover 70 (with reference to FIG. 1) to be connected to the bottom cover 10 through connection members, such as screws, are disposed on the lower portion of the bottom cover 10.

Further, connection protrusions 10e connected to the top cover 70 (with reference to FIG. 1) are disposed on the left and right edge walls 10c of the bottom cover 10.

In order to reinforce the stiffness of the bottom cover 10, an H beam may be installed on the rear surface of the bottom cover 10.

An installation member 13 to fix the first heat dissipation members 11 to the bottom cover 10 is disposed on the bottom cover 10.

The installation member 13 includes a body part 13a disposed in the leftward and rightward directions, extension parts 13b extended perpendicularly from the body part 13a toward the first heat dissipation members 11, and coupling holes 13c disposed on the extension parts 13b such that fixing members connecting the first heat dissipation members 1 and the bottom cover 10 may be connected to the coupling holes 13c.

Therefore, when the first heat dissipation members 11 are placed on the front surface of the bottom cover 10, the extension parts 13b of the installation member 13 are placed on the front surfaces of the first heat dissipation members 11 and then the fixing members are inserted into the coupling holes 13c disposed on the extension part 13b, the first heat dissipation members 11 are fixed by the fixing members under the condition that the first heat dissipation members 11 are disposed between the bottom cover 10 and the extension parts 13b.

Figure 3:
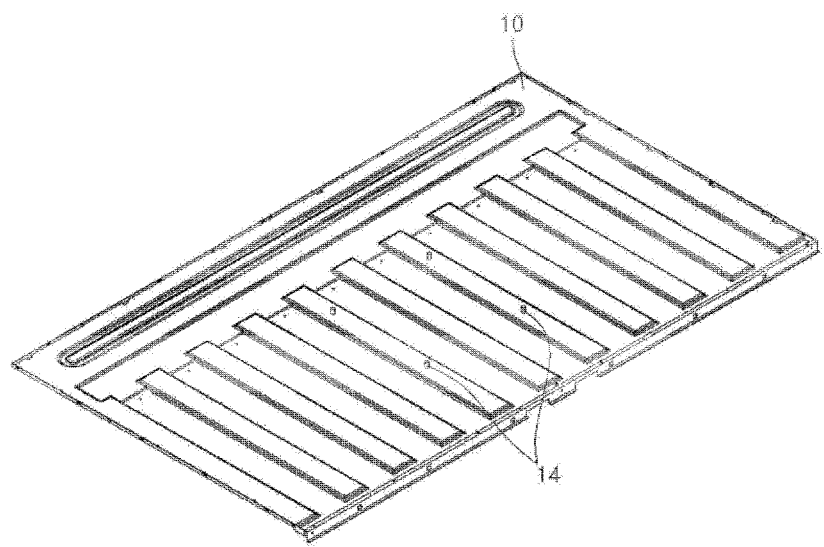
FIG. 3 is a perspective view illustrating the rear surface of the bottom cover of the backlight unit of the display device in accordance with the embodiment of the embodiment.

As shown in FIG. 3, a plurality of fixing pins 14 is disposed on the rear surface of the bottom cover 10, and a power supply device or a printed circuit board disposed on the rear surface of the bottom cover 10 is fixed to the bottom cover 10 by the fixing pins 14.

The fixing pins 14 are connected to the power supply device or the printed circuit board, thus serving to reinforce stiffness of the bottom cover 10.

Figure 4:
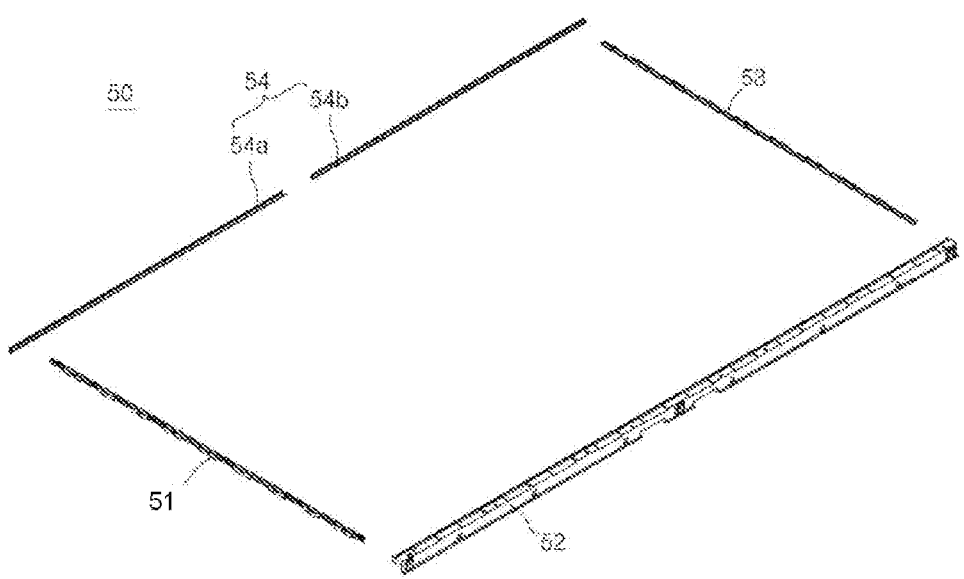
FIG. 4 is a perspective view illustrating fixing members of the backlight unit of the display device in accordance with the embodiment of the embodiment.

As shown in FIG. 4, the fixing members 50 will be described below. The fixing members 50 include a first fixing member 51, a second fixing member 52, a third fixing member 53 and a fourth fixing member 54.

The fourth fixing member 54 may be divided into two fourth fixing member parts which are denoted by reference numerals 54a and 54b.

Here, the first fixing member 51 is disposed at the lower edge of the bottom cover 10 (with reference to FIG. 2), and the second fixing member 52 is disposed at the upper edge of the bottom cover 10.

Further, the second fixing member 52 and the third fixing member 53 are disposed at the left and right edges of the bottom cover 10.

The first fixing member 51 is made of a synthetic resin, and the second fixing member 52, the third fixing member 53 and the fourth fixing member 54 are made of a metal.

Figure 5:
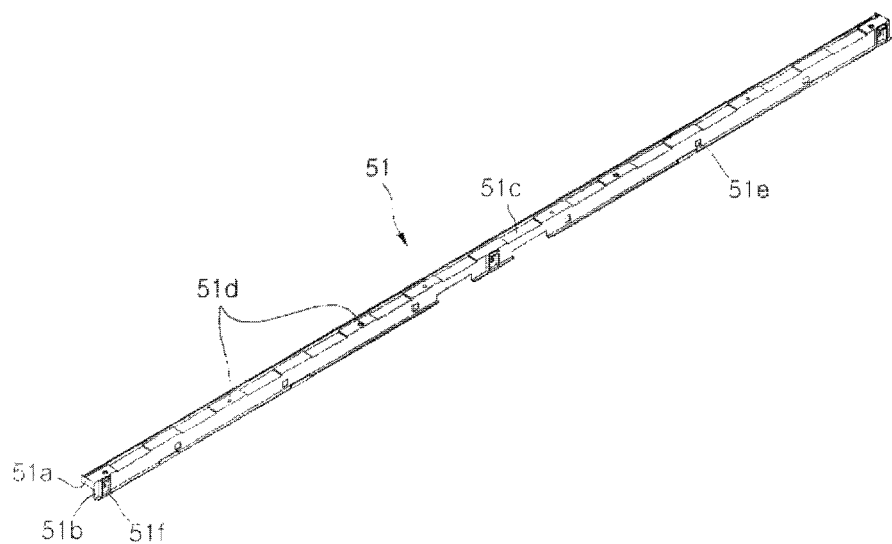
FIGS. 5 and 6 are perspective views illustrating a first fixing member of the backlight unit of the display device in accordance with the embodiment of the embodiment.
Figure 6:
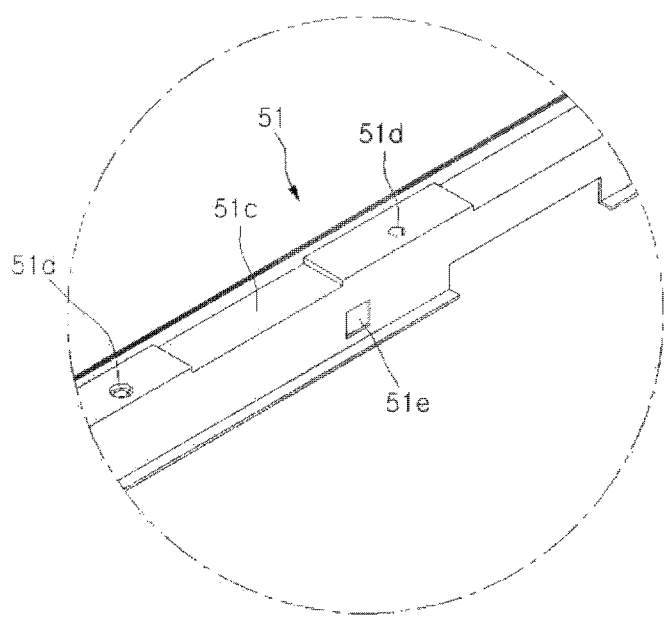

As shown in FIGS. 5 and 6, the first fixing member 51 includes a first part 51a disposed on the bottom cover 10 (with reference to FIG. 1), the light emitting module (not shown) and the optical sheet 40 (with reference to FIG. 1), and a second part 51b bent perpendicularly from the first part 51a and disposed on the bottom cover 10 (with reference to FIG. 1).

Figure 7:
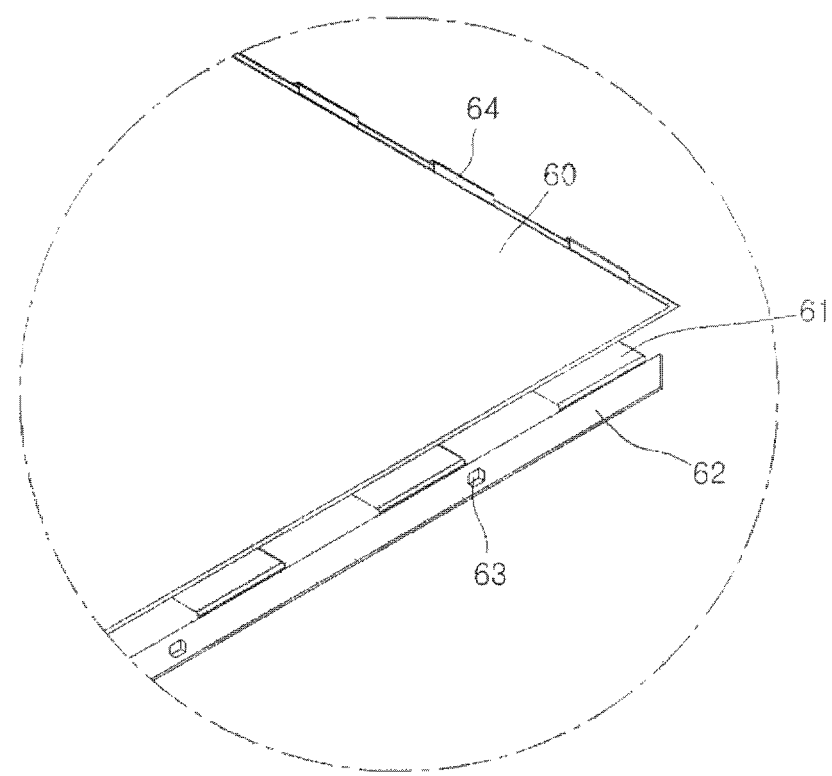
FIG. 7 is a perspective view illustrating a display panel of the display device in accordance with the embodiment of the embodiment.

Depressions 51c on which a printed circuit board 61 disposed under the display panel 60 (with reference to FIG. 1), as shown in FIG. 7, is disposed so as to be extended to the outside of the bottom cover 10 (with reference to FIG. 1) are formed on the first part 51a.

Further, first connection holes 51d are formed beside the depressions 51c so as to connect the first fixing member 51 to the bottom cover 10 (with reference to FIG. 1) through connection members, such as screws, or to connect the first fixing member 51 to the bottom cover 10 and the top cover 70 through connection members, such as screws.

Chip disposition holes 51e in which chips 63 connected to a printed circuit board 62 of the display panel 60, as shown in FIG. 7, are disposed and connection holes 51f to which connection members, such as screws, to connect the bottom cover 10 and the top cover 70 (with reference to FIG. 1) are connected are formed on the second part 51b.

Figure 8:
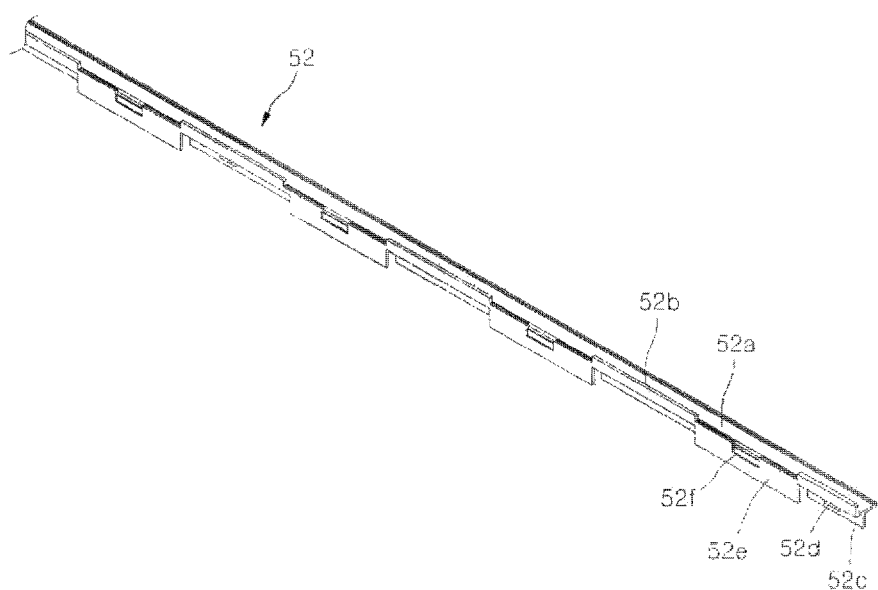
FIG. 8 is a perspective view illustrating a second fixing member of the backlight unit of the display device in accordance with the embodiment of the embodiment.

As shown in FIG. 8, the second fixing member 52 serves to support the reflective sheet 20 (with reference to FIG. 1), the light guide plate 30 (with reference to FIG. 1) and the optical sheet 40 (with reference to FIG. 1) so as to attach the reflective sheet 20, the light guide plate 30 and the optical sheet 40 to the bottom cover 10 (with reference to FIG. 1).

The second fixing member 52 includes a first part 52a to support the display panel 60 (with reference to FIG. 1), second parts 52b protruded upwards from the first part 52a to prevent movement of the display panel 60, and third parts 52c and fourth parts 52e protruded downwards from the first part 52a, separated from each other and alternately disposed to be connected to the inner and outer surfaces of the side wall of the bottom cover 10.

The second parts 52b are protruded upwards from the outer edge of the first part 52a, and the fourth parts 52e are disposed at one side of each of the second parts 52b and protruded downwards from the outer edge of the first part 52a.

Further, the third parts 52c are extended downwards from the central surface of the first part 52a.

The second fixing member 52 may be press fitted to the side wall of the bottom cover 10 (with reference to FIG. 1) using the third parts 52c and the fourth parts 52e.

Connection protrusions 52d are formed on the third parts 52c. The connection protrusions 52d are inserted into designated holes formed on the bottom cover 10 (with reference to FIG. 1) through hook connection.

Chip disposition recesses 52f are formed on the fourth parts 52e. The chip disposition recesses 52f provide spaces in which chips (not shown) of the printed circuit board 62 disposed on the display panel 60, as shown in FIG. 7, are disposed.

Portions of the first part 52a contacting the flexible printed circuit board 61 are disposed with an insulating tape or an insulating coating layer.

The third fixing member 53 has the same structure as the second fixing member 52, and thus a detailed description thereof will be omitted.

Further, the fourth fixing member 54 has the same or similar structure as or to the second fixing member 52 and the third fixing member 53, and thus a detailed description of the parts of the fourth fixing member 54 identical to those of the second fixing member 52 and the third fixing member 53 will be omitted.

The fourth fixing member 54 is disposed at the upper edge of the bottom cover 10 (with reference to FIG. 1), and need to be extended.

In this case, the fourth fixing member 54 may be warped or damaged. Therefore, the fourth fixing member 54 is divided into two parts 54a and 54b of FIG. 4, thus being more firmly connected to the bottom cover 10 (with reference to FIG. 1).

On the other hand, the first fixing member 51 has an area greater than that of the fourth fixing member 54, and has less possibility of being warped or damaged. If the first fixing member 51 is made of synthetic resin, the first fixing member 51 is more rigid and thus does not need to be divided into two parts.

Figure 9:
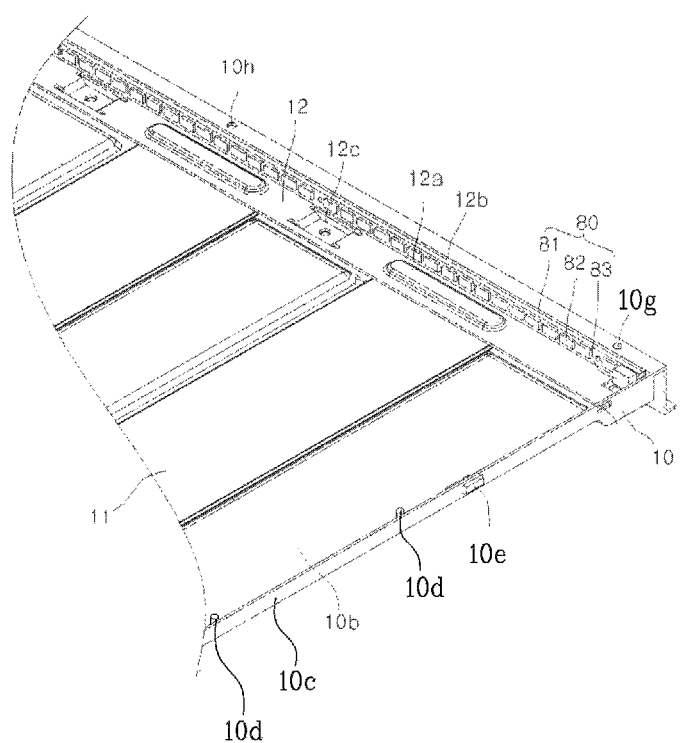
FIG. 9 is a view illustrating a light emitting module installed within the bottom cover of the backlight unit of the display device in accordance with the embodiment of the embodiment.

As shown in FIG. 9, the first heat dissipation members 11 are disposed on the front surface of the bottom cover 10 so as to be separated from each other, and second heat dissipation members 12 are disposed under the first heat dissipation members 11.

Each of the second heat dissipation members 12 includes a first heat dissipation part 12a disposed with protrusions, and a second heat dissipation part 12b disposed perpendicularly to the first heat dissipation part 12a such that a light emitting module 80 is disposed on the second heat dissipation part 12b.

Here, the uppermost surfaces of the protrusions disposed on the first heat dissipation part 12a are preferably coplanar with the first forming part 10a and the second forming parts 10b (with reference to FIG. 2).

Thereby, the reflective sheet 20 (with reference to FIG. 1) is disposed on the protrusions of the first heat dissipation part 12a and the first forming part 10a and the second forming parts 10b, thereby maintaining a coplanar state.

Insertion holes 12c are disposed on the second heat dissipation members 12, and the second heat dissipation members 12 and the lower portion of the bottom cover 10 are connected by inserting fixing members into the insertion holes 12c.

The light emitting module 80 is disposed on one surface of each of the second heat dissipation parts 12b of the second heat dissipation members 12. The light emitting module 80 includes a module substrate 81 extended along the second heat dissipation parts 12b, a plurality of light emitting elements 82 disposed on the module substrate 81 so as to be separated from each other, and a connector 83 disposed on the module substrate 81 to connect the module substrate 81 to an external power supply device or printed circuit board.

Although FIG. 9 illustrates that the light emitting elements 82 include LEDs, the light emitting elements 82 are not limited thereto. That is, the light emitting elements 82 may include lamps, such as CCFLs, or organic light emitting elements, such as OLEDs.

Preferably, the light emitting elements 82 are disposed in a 1-edge type, i.e., are disposed only on the upper or lower portions of the display panel 60 (with reference to FIG. 1) or the bottom cover 10.

In order to obtain desired brightness and uniform light distribution, the number of the light emitting elements 82 may vary according to the size of the display panel 60 (with reference to FIG. 1), i.e., the diagonal size of the display panel 60 in inches.

Preferably, the number of the light emitting elements 82 is 2.5~3.5 times the diagonal size of the display panel 60 (with reference to FIG. 1) in inches.

If the number of the light emitting elements 82 is smaller 2.5 times the diagonal size of the display panel 60 (with reference to FIG. 1) in inches or is greater 3.5 times the diagonal size of the display panel 60 in inches, the light emitting elements 82 have difficulty in providing light having proper brightness and uniform distribution.

For example, if the display panel 60 has a size of 47 inches, 118~164 light emitting elements 82 may be installed. In this embodiment, the display panel 60 has a size of 47 inches and 138 light emitting elements 82 are installed.

Among the second forming parts 10b, the protrusions 10d are disposed on the leftmost and rightmost forming parts 10b such that the protrusions 10d are separated in a straight line.

Preferably, the protrusions 10d are disposed just beside the edge walls 10c.

Figure 10:
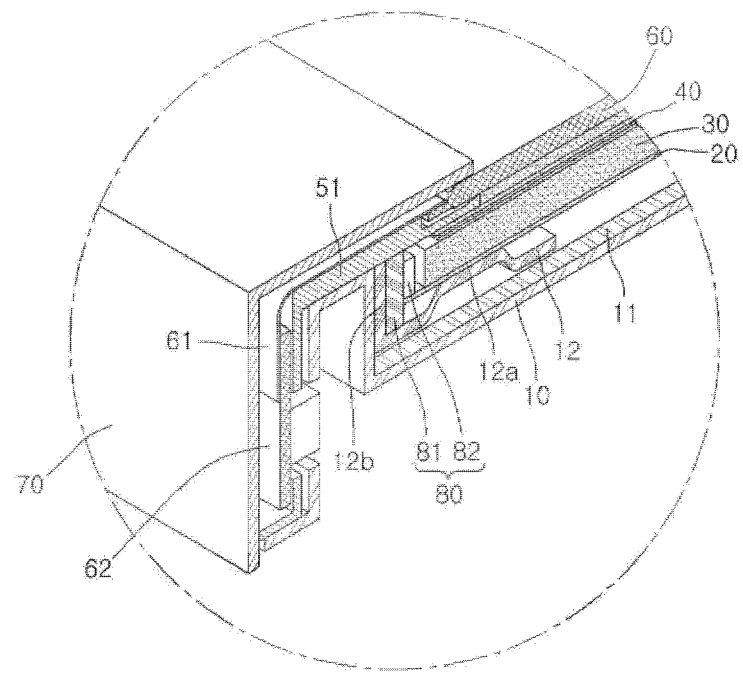
FIG. 10 is a cross-sectional view taken along the line I-I' of the display device of FIG. 1.

As shown in FIG. 10, a partial cross-section of the display device in accordance with the embodiment of the embodiment will be described below.

The first heat dissipation members 11 are disposed between the second forming parts 10b (with reference to FIG. 9) disposed on the front surface of the bottom cover 10.

The second heat dissipation members 12 are disposed in an approximate L shape, and the first heat dissipation parts 12a of the second heat dissipation members 12 contact the lower portions of the first heat dissipation members 11.

The second heat dissipation part 12b is formed integrally with the first heat dissipation part 12a such that the second heat dissipation part 12b is disposed perpendicularly to the first heat dissipation part 12a or at an angle close to perpendicular. The light emitting module 80 is disposed on the second heat dissipation pat 12b. Here, the module substrate 81 is disposed on the second heat dissipation part 12b and the light emitting elements 82 are disposed on the module substrate 81.

Therefore, if power is applied to the module substrate 81 and the light emitting elements 82 emit light, heat is generated in the course of driving the light emitting elements 82. The heat is conducted to the second heat dissipation members 12, is conducted to the first heat dissipation members 11 contacting the second heat dissipation members 12, and is then dissipated to the outside.

The reflective sheet 20 is disposed on the front surfaces of the second heat dissipation members 12 and the first heat dissipation members 11, and the light guide plate 30 is disposed on the front surface of the reflective sheet 20. The lower end of the light guide plate 30 is disposed adjacent to the light emitting elements 81, and thus light emitted by the light emitting elements 81 enters the light guide plate 30.

The light entering the light guide plate 30 undergoes reflection, total reflection and refraction within the light guide plate 30, and most of the light is directed forwards. Further, light discharged through the rear surface of the light guide plate 30 is reflected by the reflective sheet 20 and then enters back to the light guide plate 30.

The at least one optical sheet 40 inducing optical phenomenon of light is disposed on the front surface of the light guide plate 30, and the display panel 60 is disposed in front of the at least one optical sheet 40. The flexible printed circuit board 61 is connected to the end of the display panel 60. The flexible printed circuit board 61 is extended downwards from the backlight unit through the first fixing member 51, and the printed circuit board 62 is connected to the flexible printed circuit board 61 and is disposed under the bottom cover 10.

The top cover 70 surrounds the upper, lower, left and right edges of the display panel 60 and surrounds the upper, lower, left and right edges of the backlight unit including the printed circuit board 62, the flexible printed circuit board 61 and the bottom cover 10, thereby serving to connect the backlight unit and the display panel 60.

Figure 11:
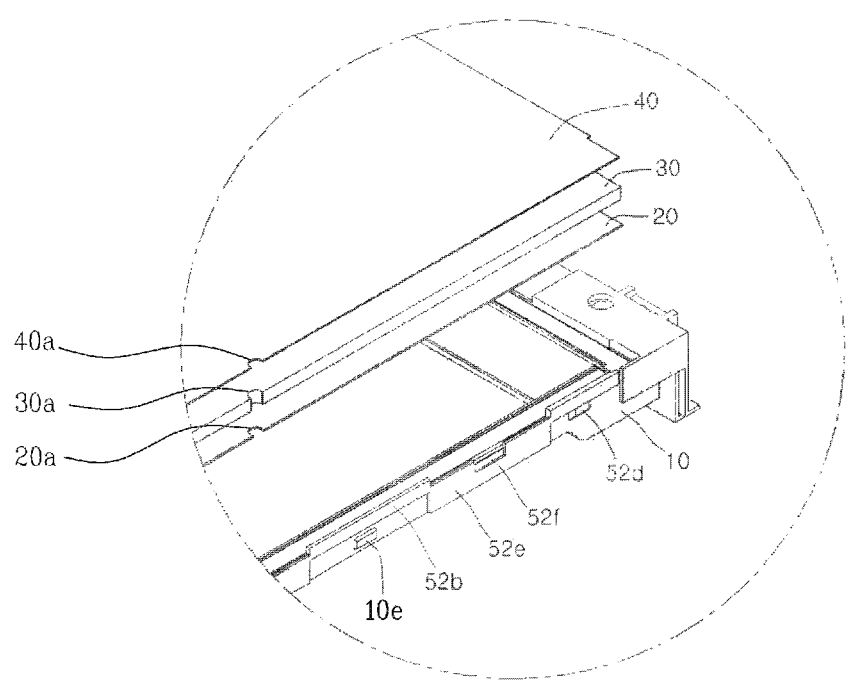
FIG. 11 is a perspective view illustrating disposition of the bottom cover, an optical sheet and a light guide plate of the backlight unit of the display device in accordance with the embodiment of the embodiment.

As shown in FIG. 11, the reflective sheet 20, the light guide plate 30 and the least one optical sheet 40 are disposed between the bottom cover 10 and the second and third fixing members 52 and 53 (with reference to FIG. 4) disposed on the side surfaces of the bottom cover 10.

Recesses 20a, 30a and 40a into which the protrusions 10d (with reference to FIG. 9) are inserted so as to be supported are respectively disposed on the side edges of the reflective sheet 20, the light guide plate 30 and the at least one optical sheet 40.

Figure 12:
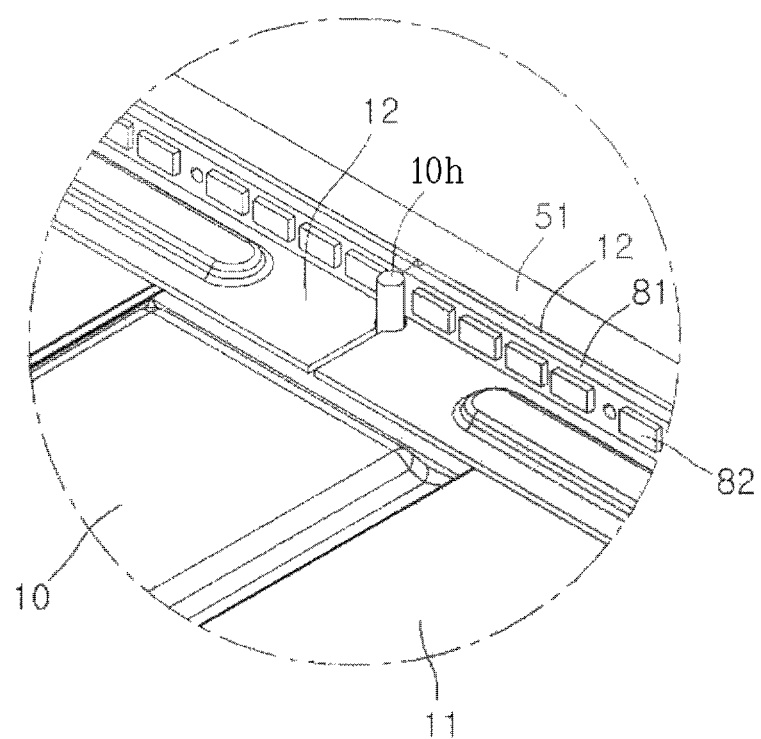
FIGS. 12 to 15 are perspective views illustrating disposition of the optical sheet, the light guide plate and a reflective sheet of the backlight unit of the display device in accordance with the embodiment of the embodiment.

On the other hand, as shown in FIG. 12, protrusions 10h are disposed on the lower portion of the bottom cover 10. Preferably, the protrusions 10h disposed on the lower portion of the bottom cover 10 are disposed between the plural second heat dissipation members 12.

The reason why the plural second heat dissipation members 12 are disposed is that convenience in installation of the second heat dissipation members 12 is achieved, and the reason why the protrusions 10h are disposed between the second heat dissipation members 12 is that positions of the second heat dissipation members 12 are correctly set when the second heat dissipation members 12 are disposed. That is, designated recesses are formed on the side surfaces of the second heat dissipation members 12 and the protrusions 10h are located in the recesses, thereby allowing the second heat dissipation members 12 to be correctly disposed.

Figure 13:
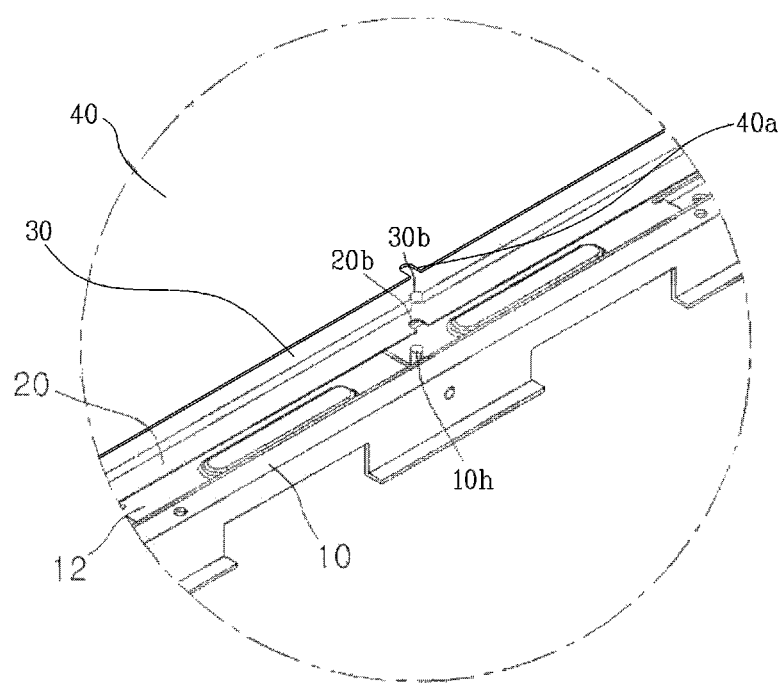

As shown in FIG. 13, recesses 20b, 30b and 40b into which the protrusions 10h (with reference to FIG. 12) are inserted so as to be supported are respectively disposed on the lower edges of the reflective sheet 20, the light guide plate 30 and the at least one optical sheet 40.

That is, since the protrusions 10d and 10h are inserted into the recesses 20a, 30a and 40a disposed on the side edges of the reflective sheet 20, the light guide plate 30 and the at least one optical sheet 40 and the recesses 20b, 30b and 40b disposed on the lower edges of the reflective sheet 20, the light guide plate 30 and the at least one optical sheet 40, the reflective sheet 20, the light guide plate 30 and the at least one optical sheet 40 are securely fixed in place without movement of positions thereof.

Figure 14:
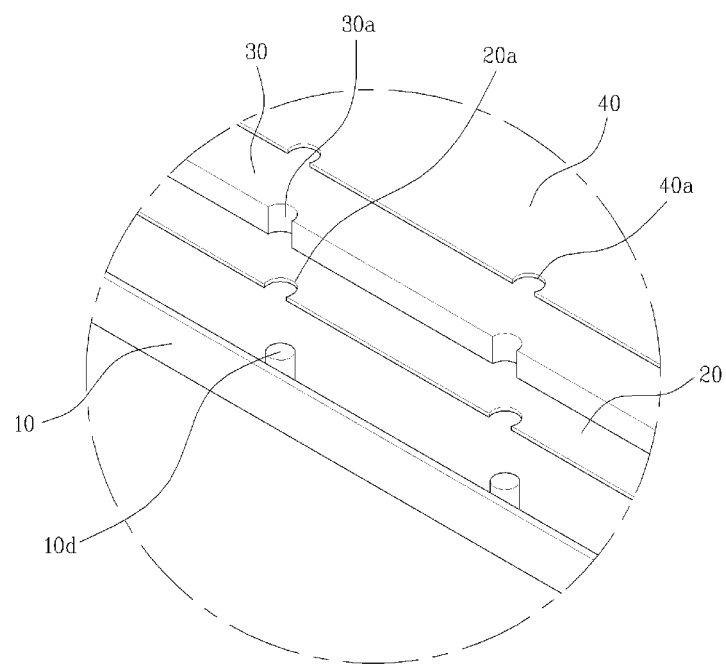

As shown in FIG. 14, preferably, the protrusions 10d disposed at the side edges of the bottom cover 10 are separated from each other, and the recesses 20a, 30a and 40a are disposed so as to correspond to the positions of the protrusions 10d.

Figure 15:
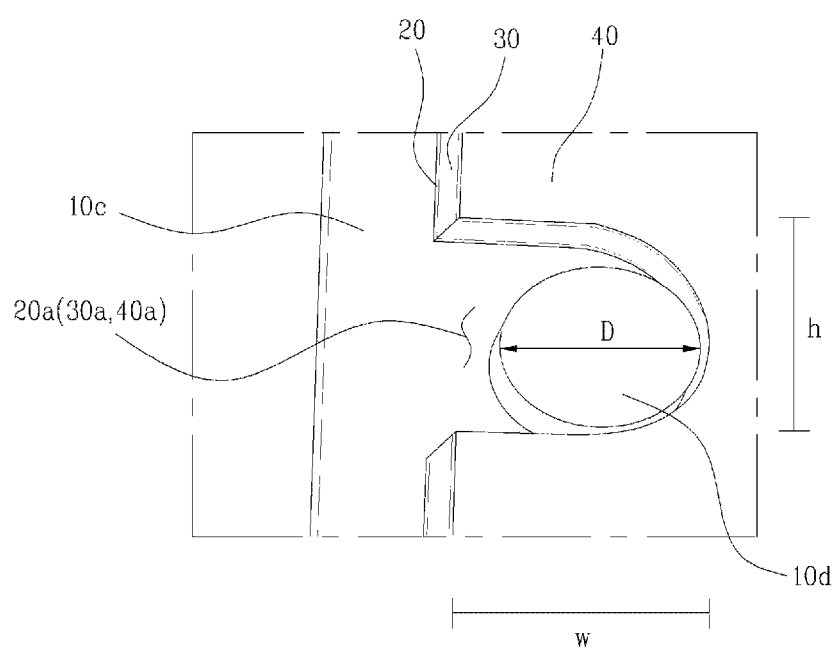

As shown in FIG. 15, each of the protrusions 10d preferably includes a cylindrical boss, but is not limited thereto.

Preferably, the recesses 20a, 30a and 40a disposed on the reflective sheet 20, the light guide plate 30 and the at least one optical sheet 40 are disposed such that positions of the recesses 20a, 30a and 40a are overlapped with each other when the reflective sheet 20, the light guide plate 30 and the at least one optical sheet 40 are vertically stacked.

Therefore, shapes and sizes of the recesses 20a, 30a and 40a are preferably identical. In more detail, the recesses 20a, 30a and 40a are preferably formed in a U shape.

Preferably, outer portions of the recesses 20a, 30a and 40a are open in the direction of the edges of the reflective sheet 20, the light guide plate 30 and the at least one optical sheet 40 and inner portions of the recesses 20a, 30a and 40a are rounded. This enables easy coupling between the recesses 20a, 30a and 40a and the protrusions 10d and prevents movement of the reflective sheet 20, the light guide plate 30 and the at least one optical sheet 40 after coupling.

Preferably, the horizontal width w of the recesses 20a, 30a and 40a and the vertical height h of the recesses 20a, 30a and 40a are greater than the diameter D of the protrusions 10d, and the radius of curvature of the rounded inner portions of the recesses 20a, 30a and 40a is greater than the radius of the protrusions 10d.

This also enables easy coupling between the recesses 20a, 30a and 40a and the protrusions 10d.

Further, the edges of the reflective sheet 20, the light guide plate 30 and the at least one optical sheet 40 are horizontally extended beyond the protrusions 10d so as to be adjacent to the edge walls of the bottom cover 10, thereby minimizing an interval between the bottom cover 10 and the reflective sheet 20, the light guide plate 30 and the at least one optical sheet 40 and thus minimizing optical loss.

As apparent from the above description, in a backlight unit and a display device in accordance with one embodiment of the embodiment, recesses, each of which is disposed with one opened side, are disposed on a reflective sheet, a light guide plate and at least one optical sheet and are coupled with protrusions disposed on a bottom cover, thereby allowing the reflective sheet, the light guide plate and the at least one optical sheet to be more easily mounted on the bottom cover.

Further, the edges of the reflective sheet, the light guide plate and the at least one optical sheet are horizontally extended beyond the protrusions so as to be adjacent to the edge walls of the bottom cover, thereby minimizing an interval between the bottom cover and the reflective sheet, the light guide plate and the at least one optical sheet and thus minimizing optical loss.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting device comprising:
 a bottom cover;
 a light emitting module including a plurality of light emitting elements, the light emitting module being disposed in a lower portion of an inside of the bottom cover;
 fixing members including:
  a first fixing member;
  a second fixing member;
  a third fixing member; and
  a fourth fixing member,
  wherein the second fixing member includes:
   a first part configured to support a display panel;
   second parts protruded upwardly from the first part, the second parts configured to prevent movement of the display panel; and
   third parts and fourth parts protruded downwardly from the first part, the third parts and fourth parts separated from each other and alternately disposed to be connected to inner and outer surfaces of a side wall of the bottom cover, and
  wherein each of the fixing members is disposed at a different side of the bottom cover;
 a light guide plate disposed adjacent to the light emitting module and in front of the bottom cover;
 first recesses disposed at edges of the light guide plate; and
 first protrusions disposed on the bottom cover, the first protrusions being inserted into the first recesses,
 wherein each of the first recesses is disposed on an inside of the edges of the light guide plate, wherein at least one connection hole is formed in the bottom cover, and
wherein the fixing members are connected to the bottom cover through connection members.

2. The light emitting device according to claim 1, wherein the first protrusions comprise at least two protrusions so as to correspond to positions of the first recesses.

3. The light emitting device according to claim 1, further comprising at least one optical sheet and a reflective sheet,
wherein the light guide plate is disposed between the optical and the reflective sheet, and
wherein the at least one optical sheet, the light guide plate and the reflective sheet are supported by the first protrusions.

4. The light emitting device according to claim 1, wherein at least one inner portion of the first recesses is rounded.

5. The light emitting device according to claim 4, wherein the first protrusions are cylindrical bosses, and
wherein a radius of curvature of the rounded inner portions of the first recesses is greater than a radius of the cylindrical bosses.

6. The light emitting device according to claim 1, wherein vertical widths of the first recesses are greater than diameters of the first protrusions.

7. The light emitting device according to claim 1, wherein the first protrusions are formed on a front surface of the bottom cover.

8. The light emitting device according to claim 1, wherein the first fixing member is made of a synthetic resin, and the second, third and fourth fixing members are made of metal.

9. The light emitting device according to claim 1, wherein the second fixing member further comprises connection protrusions formed on the third parts.

10. The light emitting device according to claim 1, wherein the second fixing member further comprises chip disposition recesses formed on the fourth parts.

11. The light emitting device according to claim 1, further comprising at least one optical sheet and a reflective sheet,
wherein each of the first recesses is formed by an opening extending in an inner direction in the edges of the light guide plate, the reflective sheet and the at least one optical sheet.

12. The light emitting device according to claim 1, further comprising:
first heat dissipation members disposed on a front surface of the bottom cover, the first heat dissipation members being separated from each other; and
second heat dissipation members disposed under the first heat dissipation members.

13. The light emitting device according to claim 12, further comprising second protrusions disposed on a lower portion of the bottom cover,
wherein the second protrusions are disposed between adjacent second heat dissipation members.

14. The light emitting device according to claim 13, wherein second recesses are formed on a side surface of each of adjacent second heat dissipation members.

15. The light emitting device according to claim 14, wherein the second protrusions are inserted into the second recesses on the side surface of each of the adjacent second heat dissipation members.

16. A light emitting device comprising:
a bottom cover;
a light emitting module including a plurality of light emitting elements, the light emitting module being disposed at a lower portion of an inside of the bottom cover;
fixing members including:
a first fixing member;
a second fixing member;
a third fixing member; and
a fourth fixing member,
wherein the second fixing member includes:
a first part configured to support a display panel;
second parts protruded upwardly from the first part, the second parts configured to prevent movement of the display panel; and
third parts and fourth parts protruded downwardly from the first part, the third parts and fourth parts separated from each other and alternately disposed to be connected to inner and outer surfaces of a side wall of the bottom cover, and
wherein each of the fixing members is disposed at a different side of the bottom cover;
a light guide plate disposed adjacent to the light emitting module and disposed in front of the bottom cover;
first recesses disposed at edges of the light guide plate;
first protrusions disposed on the bottom cover, the first protrusions being inserted into the first recesses;
a liquid crystal display panel disposed in front of the light guide plate; and
a top cover disposed in front of the liquid crystal display panel,
wherein each of the first recesses is disposed in an inside of the edges of the light guide plate,
wherein at least one connection hole is formed in the bottom cover,
wherein the fixing members are connected to the bottom cover through connection members, and
wherein the fixing members fix the bottom cover and the top cover.

17. The light emitting device according to claim 16, further comprising at least one optical sheet and a reflective sheet,
wherein the light guide plate is disposed between the optical and the reflective sheet, and
wherein the fixing members are disposed outside of the light guide plate, the reflective sheet and the at least one optical sheet.

18. A light emitting device comprising:
a bottom cover;
a light emitting module including a plurality of light emitting elements, the light emitting module being disposed in a lower portion of an inside of the bottom cover;
fixing members including:
a first fixing member;
a second fixing member;
a third fixing member; and
a fourth fixing member,
wherein each of the fixing members is disposed at a different side of the bottom cover;
a light guide plate disposed adjacent to the light emitting module and in front of the bottom cover;
first recesses disposed at edges of the light guide plate;
first protrusions disposed on the bottom cover, the first protrusions being inserted into the first recesses,
first heat dissipation members disposed on a front surface of the bottom cover, the first heat dissipation members being separated from each other;
second heat dissipation members disposed under the first heat dissipation members; and
second protrusions disposed on a lower portion of the bottom cover,
wherein the second protrusions are disposed between adjacent second heat dissipation members, wherein each of the first recesses is disposed on an inside of the edges of the light guide plate, wherein at least one connection hole is formed in the bottom cover, and wherein the fixing members are connected to the bottom cover through connection members.

* * * * *